United States Patent Office 3,400,536
Patented Sept. 10, 1968

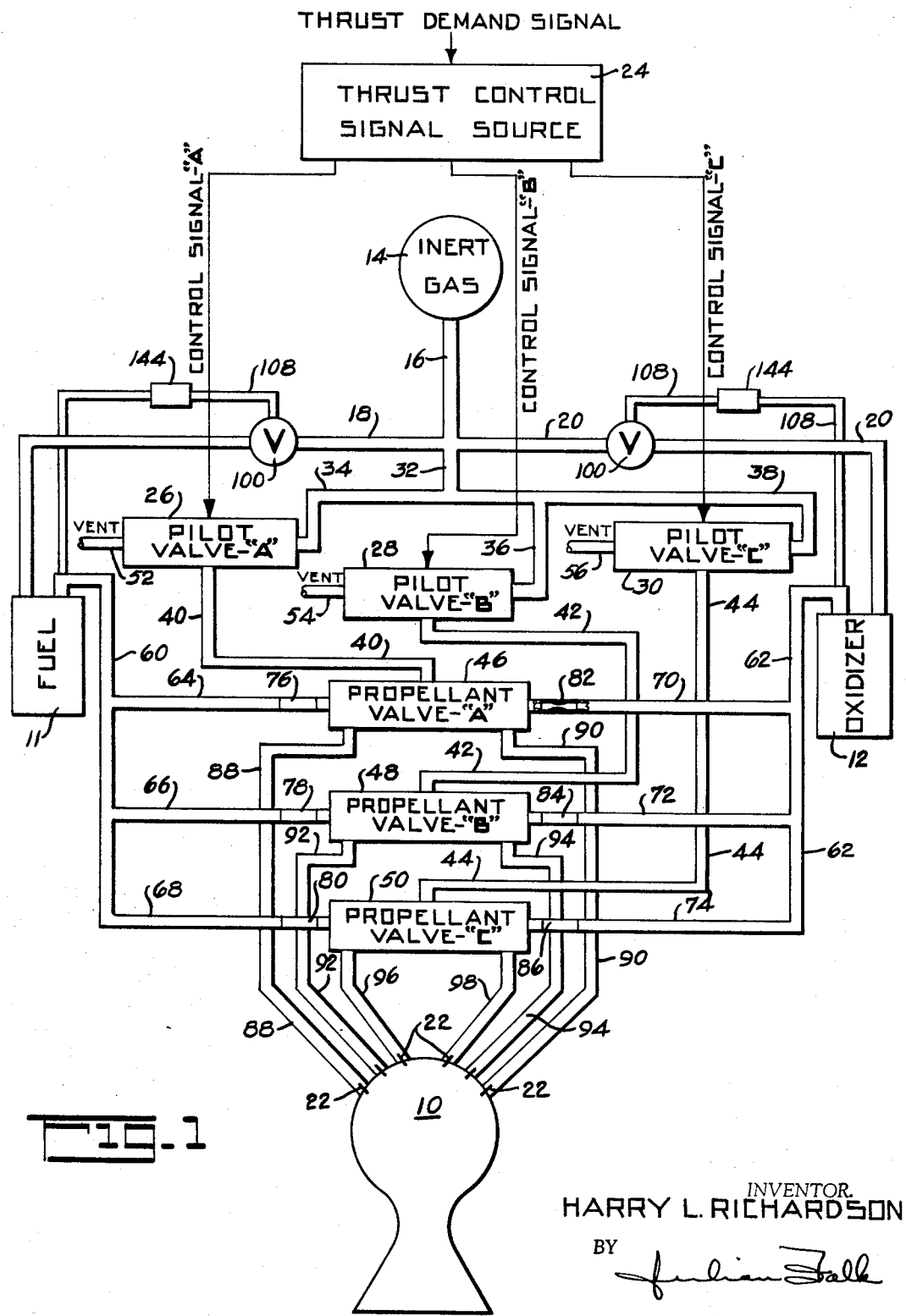

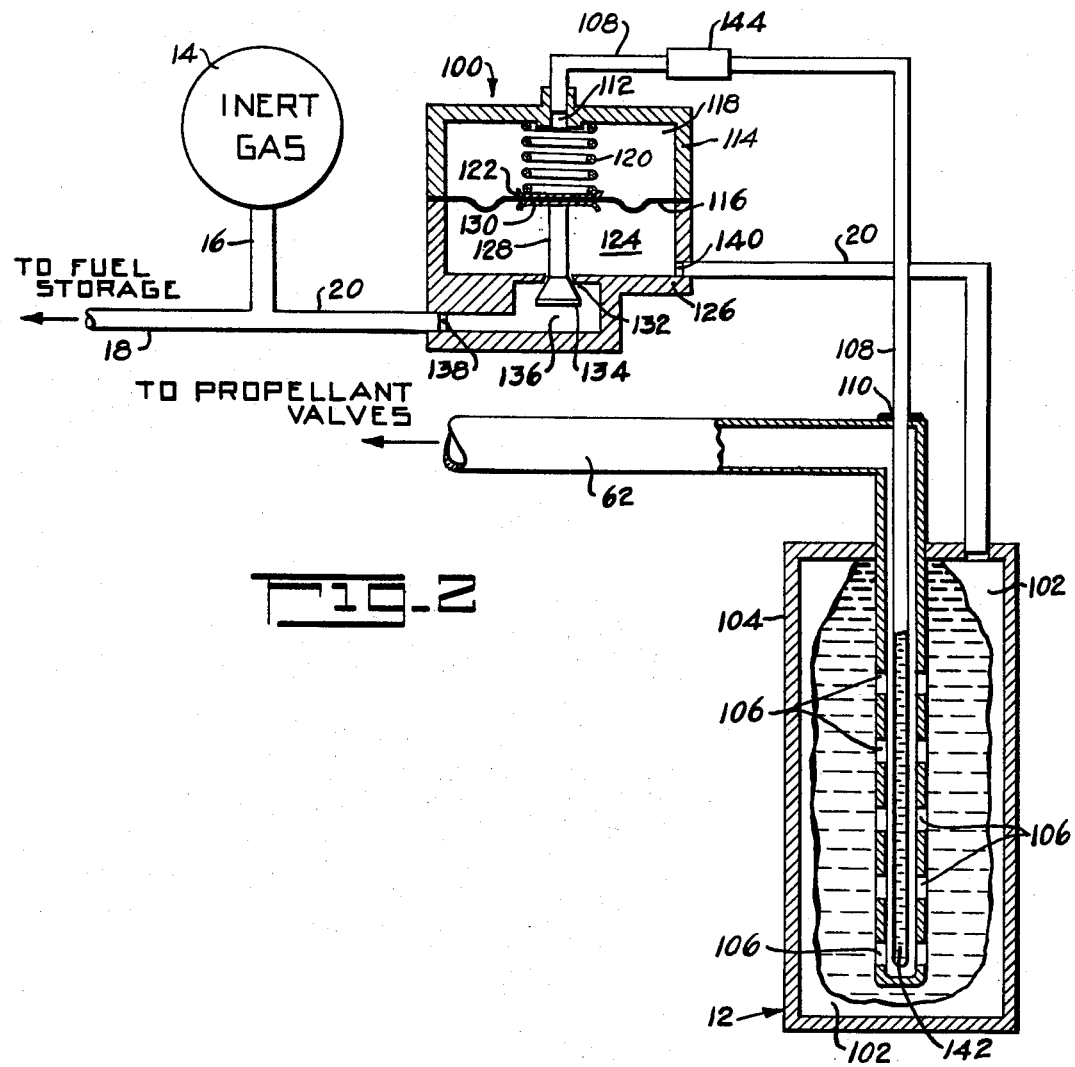

3,400,536
TEMPERATURE COMPENSATION FOR THRUST CONTROL SYSTEMS
Harry L. Richardson, River Edge, N.J., assignor to Curtiss-Wright Corporation, a corporation of Delaware
Filed May 14, 1965, Ser. No. 455,725
4 Claims. (Cl. 60—39.48)

This invention relates to thrust control systems for rocket engines and the like and is particularly directed to a system for controlling the propellant flow for propellants which are effected by changes in the environmental temperatures.

In liquid propelled rocket systems, a fuel and oxidizer, which may be hypergolic type propellants, are pumped to the rocket motor combustion chamber through the use of an inert gas stored under pressure. The liquid propellants normally in use today, such as the cryogenics, are affected by changes in temperature which cause changes in the vapor pressure characteristics of the propellants. It will be readily apparent that the flow of the propellants to the rocket motor combustion chamber may be adversely affected by changes in the vapor pressure and may cause variations in the oxidizer-fuel ratio thus resulting in undesirable variations in the thrust output.

It is a purpose of the present invention to provide a means for compensating for variations in the vapor pressure of the propellants so that the oxidizer-fuel ratio will be accurately maintained even during variations in the environmental temperatures. The invention is generally carried out by providing a means which determines the changes in the vapor pressure of the propellants and thereby varies the feed pressure for the propellant tanks in accordance with the changes in vapor pressure so that a constant flow of the propellants to the rocket motor combustion chamber will be accurately maintained to provide a constant oxidizer-fuel ratio for a desired thrust level output.

Accordingly, it is one object of the invention to provide a temperature compensation means for a liquid fuel system.

It is another object of the invention to provide a novel and improved means for compensating for variations in temperatures in a liquid propellant system for rocket engines or the like.

It is an additional object of the invention to provide a novel and improved means for controlling the propellant flow for propellants having adverse vapor pressure characteristics.

It is still another object of the invention to provide a novel and improved means responsive to changes in vapor pressure of the liquid fuels for a liquid fuel rocket engine or the like and for maintaining the fuel flow at a desired level.

Other objects and advantages of the invention will be best understood with the accompanying drawings wherein;

FIG. 1 diagrammatically shows a rocket engine fuel control system including the invention; and FIG. 2 is an enlarged view showing a portion of the fuel control system of FIG. 1 with parts thereof shown in section.

Referring to FIG. 1, a rocket motor 10 is diagrammatically illustrated therein whose combustion chamber is supplied with a fuel and oxidizer from the fuel and oxidizer storage tanks 11 and 12, respectively. The fuel and oxidizer may be of the hypergolic type which ignite instantaneously upon contact in the combustion chamber of the rocket motor 10. The fuel and oxidizer are pumped from their respective storage tanks 11 and 12 by an inert gas stored under pressure in a storage tank 14. The gas storage tank 14 has a line 16 running therefrom which divides into two lines 18 and 20 respectively leading to the storage tanks 11 and 12. Suitable valve means are provided for controlling the flow of the pressurized gas to the storage tanks 11 and 12, as will be more fully explained hereinafter. The fuel and oxidizer are each supplied through associated fuel injectors 22 diagrammatically illustrated in FIG. 1 wherein the fuel is injected along with the oxidizer into the combustion chamber of the rocket motor 10 for combustion therein.

In order to control the flow of fuel and oxidizer to the rocket motor 10 and thereby controlling the thrust output of said rocket motor 10, a thrust control system is provided. For convenience of description the fuel and oxidizer will hereinafter be referred to as fuels or propellants. The thrust control system includes a thrust control signal source illustrated at 24 which may comprise a digital computer which converts an analog thrust demand into digital form so as to provide control signals illustrated in FIG. 1 as, control signal A, control signal B and control signal C. The signals A, B and C each have a predetermined signal level and it should be understood that any number of control signals having predetermined levels may be provided for providing desired levels of thrust output. The thrust control system as described herein is of the incremental type which provides specific predetermined levels of fuel flow so as to provide specific levels of thrust output.

Each of the control signal lines is respectively connected to a pilot valve A, a pilot valve B and a pilot valve C which signal lines activate their respective pilot valve member as will be explained hereinafter. The pilot valves may be a solenoid type which may be opened or closed in response to an electric signal such as that from control signal lines A, B and C. Each of the pilot valves designated at 26, 28 and 30 is connected to gas pressure from the gas storage tank 14 through line 16 and through a line 32 which divides into lines 34, 36 and 38 each of which are respectively connected to a pilot valve A, B or C. Each of the pilot valves A, B or C is also provided with a vent as illustrated whose function will also be explained hereinafter. Each of the pilot valves 26, 28 and 30 is respectively connected through a gas line 40, 42 and 44 to an associated propellant valve A, B and C designated by numerals 46, 48 and 50. The pilot valves 26, 28 and 30 are responsive to individual control signals A, B or C or combinations thereof to connect its associated inlet gas pressure line 34, 36 and 38 through an outlet line 40, 42 or 44 to its respective propellant valve 46, 48 or 50. When a pilot valve is activated by an associated control signal such as, for example, pilot valve 26, the pilot valve 26 will open to vent gas pressure from the propellant valve 46, to the line 40 and out its vent tube 52. The pilot valve 28 and pilot valve 30 are respectively provided with vent tubes 54 and 56. The pilot valves are normally in a position wherein gas pressure is supplied to an associated propellant 46, 48 or 50 and an activation of a pilot valve by a control signal will serve to vent the gas pressure from its associated propellant valve 46, 48 or 50. The propellant valves are normally maintained in a closed position by the gas pressure, but, when the gas pressure is vented through the pilot valves, the associated propellant valve will be opened.

The propellant valves 46, 48 and 50 are each connected to the fuel and oxidizer tanks 11 and 12, respectively, through lines 60 and 62. The fuel and oxidizer lines 60 and 62 are respectively provided with branch lines 64, 66, 68 for supplying fuel to one side of an associated propellant valve 46, 48 or 50 and lines 70, 72, 74 for supplying oxidizer to the other side of the associated propellant valves 46, 48 and 50. A cavitating venturi is placed on the upstream side of the propellant valves 46, 48 and 50 for the purpose of providing a metered fuel and oxidizer flow rate which is independent of the pressure in the combustion chamber of the rocket motor 10. Thus the cavitating venturi 76, 78 and 80 are respectively provided on one side of propellant valve 46, 48 and 50 and cavitating venturi 82, 84 and 86 are respectively provided on the other side thereof with cavitating venturi 82 being shown in section with a portion of line 70 broken away.

As illustrated in FIG. 1, the propellant valve 46 is provided with discharge lines 88 and 90, the propellant valve 48 is provided with discharge valves 92 and 94 and the propellant valve 50 is provided with discharge lines 96 and 98 each of which discharge lines is connected to an injector 22 for separately injecting the fuel and oxidizer into the combustion chamber of the rocket motor 10. The propellant valves 46, 48 and 50 are so constructed so as to separately supply fuel and oxidizer to their respective discharge lines without mixing the fuel and oxidizer. When the propellant valve associated with a particular control signal is vented through a pilot valve as explained above, a propellant valve will open to provide a flow of fuel and oxidizer to its associated injector 22. The injectors 22 are so designed that they each have a specific flow area. In other words each set of injectors, respectively supplying fuel and oxidizer to the rocket motor 10, has a predetermined percentage of the total flow area of all the injector flow area for injecting said fuel and oxidizer. By this means, a specific amount of fuel may be provided to the rocket motor 10 in accordance with a control signal to provide a predetermined thrust output level. It has been found that the number of attainable flow levels of fuel can be expressed by the formula $(2^n-1)$, where $n$ equals the number of pilot valves provided. Thus, in the embodiment shown in FIG. 1 seven levels of fuel flow may be provided while using three pilot valves. It should be understood however that the thrust control system illustrated in FIG. 1 is provided merely for purposes of description and that the invention, which will be more clearly explained below, is applicable to other types of thrust control systems such as a continuously variable or annular metered system. Reference may be made to copending application entitled "Incremental Thrust Control System by Harry L. Richardson and Ludwig Muhlfelder (Ser. No. 455,802; filed May 14, 1965), for a more detailed description of the thrust control system illustrated and the components used therein.

In thrust control systems which make use of cavitating venturi as shown in FIG. 1 as a metering element for the fuel, the venturi devices meter the fuel in accordance with the relationship expressed by the formula $$F_\omega = KA(P_f - P_v)^{\frac{1}{2}}$$

where $F_\omega$ equals the mass flow rate of the fuel, A equals the area of the venturi throat, $P_f$ is the pressure upstream of the venturi and $P_v$ is equal to the vapor pressure of the propellants. Some propellants, especially the cryogenics, exhibit wide variations in vapor pressure with variations in temperature. It is a purpose of the invention to adjust the feed pressure upstream of the venturi restrictions for changes in the propellant temperature so that a constant value of mass flow rate of fuel will be obtained for a desired thrust level during temperature changes of the propellants. In other words, it is a purpose of the invention to maintain the value $(P_f - P_v)$ constant for a desired fuel-oxidizer ratio.

Referring to FIG. 2, the invention is more clearly illustrated therein. As explained above, the gas storage tank 14 is connected to the fuel storage tank 12 through lines 16 and 20 and a discharge line is provided from the tank 12 at 62. In order to regulate the pressure supplied to the fuel tank 12 a regulator valve 100 is provided in the line 20 which regulates the pressure supplied from the tank 14 to the line 20 and to the tank 12. The fuel, oxidizer in this case, in the tank 12 is contained in an expulsion bag 102 which is a flexible bag that may be subjected to gas pressure wherein the fuel will be squeezed out of the bag and into the line 62. It will be seen that the line 62 enters the storage tank 12 through a storage tank wall 104 at the top portion thereof and extends substantially within the tank 12. The line 62 at the portion within the tank 12 is provided with a plurality of openings 106 so that, when the expulsion bag 102 is subjected to pressure from line 20, the fuel will be forced into the openings 106 of the line 62 and out of the tank 12 to an associated propellant valve 46, 48 or 50.

A capillary tube 108 is disposed within the hollow portion of the tube 62 through an opening 110 with suitable sealing material provided around said opening. The capillary tube 108 is connected to the valve member 100 through an opening 112 in the outer housing 114 of said valve 100. A flexible diaphragm 116 is contained within the upper portion of the valve member 100 and is connected across the inner portion of the outer housing wall 114 and defines between said diaphragm and the upper wall, illustrated in FIG. 2, a chamber 118. A spring 120 rests at one end against a protrusion on the housing wall 114 and at its other end rests on a plate portion 122 which is connected to the diaphragm 116. A chamber 124 is provided between the diaphragm member 116 and an axially extending wall 126 which is provided in the valve 100. A valve stem 128 is attached to a plate member 130 connected to the diaphragm 116 and extends through an opening 132 in said wall 126. The valve stem 128 has a head portion 134 which is so shaped that when the valve stem is raised it will close off the opening 132. As further illustrated, the wall 126 divides two chambers, chamber 124 between the wall 126 and the diaphragm member 116, and a chamber 136 between the wall 126 and the lower wall portion 114 of the valve housing. The line 20 from the gas storage tank 14 is connected to the chamber 136 through an opening 138 with said line 20 being connected at the other side of the valve 100 through an opening 140 communicating with the chamber 124. It will be apparent therefore that, as the valve stem 128 is raised or lowered, the opening 132 will connect with the chambers 124 and 136 to permit the gas pressure 20 to flow across the valve member and to the tank 12.

The capillary tube or capillary line 108 is closed at its lower portion 142, which is disposed within the portion of the line 62 in the storage tank 12, and said capillary tube 108 contains a supply of propellant or fuel which is the same as that contained in the expulsion bag 102. It will be apparent therefore that variations in the temperature which affect the fuel in the expulsion bag 102 and cause changes in the vapor pressure thereof will also have the same effect on the fuel contained in the capillary tube 108 to cause changes in the vapor pressure therein. Changes in the vapor pressure in said line 108 will be transmitted to the chamber 118 of the valve member 100 to cause the diaphragm member 116 to raise or lower the valve stem 128 and thereby regulate the flow of gas pressure across said valve member 100. Thus, an increase in the vapor pressure in the line 108 will cause an increase in the pressure in the chamber 118 resulting in the valve member 128 being pushed downward and increasing the opening 132 to thereby result in an increase in the pressure supplied to the tank 12. Therefore, when there is an increase in the vapor pressure of the fuel in the expulsion bag 102 which might cause an increase in the pressure resisting the feed pressure, the valve member 100 will be opened further to provide more pressure in the line 20 to increase the relative pressure between the gas and the vapor pressure of the fuel to maintain the value $(P_f - P_v)$ constant for a desired fuel-oxidizer ratio.

An expansion volume is provided through a member 144 contained in the upper portion of the capillary tube 108 so as to permit expansion of the vapor pressure in the 108 during storage at room temperature so that excessive pressure will not be built up when the system is shut down. The expansion volume is provided through a chamber of increased size in the line 108 at the portion shown at 144 and may be of sufficient size to provide for variations in the vapor pressure of the fuel when stored at room temperatures.

It will be seen from the above description that a novel system is provided for compensating for increases in the temperature of propellants, particularly for propellants which have adverse vapor pressure characteristics. The system provides a flow of fuel which is maintained at a constant value for a thrust demand of a desired level. It will be apparent that accurate control of the oxidizer-fuel ratio will be maintained without requiring the use of additional variable metering devices.

While I have described my invention in detail in the above description, it will be obvious that various modifications and changes may be made by those skilled in the art without departing from the spirit and scope thereof. I intended to cover such modifications in the appended claims.

I claim:

1. Means for controlling the pumping of fuel in a rocket engine fuel system of the type having means for storing liquid fuel and means for pumping the fuel from the fuel storing means, the controlling means comprising:
   (a) adjustable means connected to the pumping means for controlling the pumping of the fuel from the fuel storing means;
   (b) means for regulating the adjustable means connected to the adjustable means and responding to the increases in the temperature of the fuel in the fuel storing means to increase the pumping of the fuel from the fuel storing means with an increase in the temperature; and
   means for conveying fuel including
   (i) a fuel conduit connected to the fuel storing means, the fuel being pumped from the fuel storing means entering at the upstream end of the fuel conduit, and
   (ii) means for regulating the rate of flow of fuel in the fuel conveying means substantially as a a function of the fuel pressure at the upstream end and the vapor pressure of the fuel.

2. A controlling means as recited in claim 1 wherein the regulating means includes a substantially narrow neck portion in the fuel conduit.

3. A controlling means as recited in claim 2 wherein the regulating means includes a cavitating venturi.

4. A controlling means as recited in claim 2 wherein the fuel conduit includes a plurality of branch conduits, at least some of the branches having the regulating means.

References Cited

UNITED STATES PATENTS

| | | | |
|---|---|---|---|
| 2,201,728 | 5/1940 | Hoesel | 236—92 |
| 2,568,114 | 9/1951 | Cornelius | 137—468 |
| 2,917,067 | 12/1959 | Pearl | 236—92 |
| 3,205,656 | 9/1965 | Elverum | 60—258 |
| 2,940,256 | 6/1960 | Conyers | 60—259 X |
| 2,995,008 | 8/1961 | Fox | 60—39.48 X |
| 3,132,475 | 5/1964 | Hopper | 60—39.48 X |
| 3,214,061 | 10/1965 | Mills | 222—54 |
| 3,230,706 | 1/1966 | Tripp | 60—39.09 X |

MARTIN P. SCHWADRON, *Primary Examiner.*

D. HART, *Assistant Examiner.*